(12) United States Patent
Um et al.

(10) Patent No.: US 10,216,046 B2
(45) Date of Patent: Feb. 26, 2019

(54) LIQUID CRYSTAL DISPLAY DEVICE AND METHOD OF MANUFACTURING THE SAME

(71) Applicant: Samsung Display Co. Ltd., Yongin, Gyeonggi-Do (KR)

(72) Inventors: Nu Ree Um, Icheon-si (KR); Min Jung Kang, Incheon (KR); Hee Ra Kim, Seoul (KR); Sang Hun Lee, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 96 days.

(21) Appl. No.: 14/675,229

(22) Filed: Mar. 31, 2015

(65) Prior Publication Data
US 2016/0195749 A1 Jul. 7, 2016

(30) Foreign Application Priority Data

Jan. 7, 2015 (KR) ........................ 10-2015-0001756

(51) Int. Cl.
*G02F 1/1339* (2006.01)
*G02F 1/1362* (2006.01)

(52) U.S. Cl.
CPC .... *G02F 1/13394* (2013.01); *G02F 1/136209* (2013.01); *G02F 1/136227* (2013.01); *G02F 2001/13396* (2013.01)

(58) Field of Classification Search
None
See application file for complete search history.

(56) References Cited

U.S. PATENT DOCUMENTS

| 2006/0220021 | A1* | 10/2006 | Yamazaki | ........... H01L 27/1214 257/59 |
| 2009/0303423 | A1* | 12/2009 | Kim | .................... G02F 1/13394 349/110 |
| 2013/0329155 | A1* | 12/2013 | Kwak | ..................... G02F 1/136 349/43 |
| 2014/0049717 | A1* | 2/2014 | Kwak | ............... G02F 1/133512 349/43 |

(Continued)

FOREIGN PATENT DOCUMENTS

| JP | 2006-091055 | 4/2006 | |
| JP | 2009251417 | * 10/2009 | ........... G02F 1/1339 |
| KR | 10-2007-0035145 | 3/2007 | |

(Continued)

OTHER PUBLICATIONS

JP 2009-251417 to Kobayashi et al. (English abstract).*

*Primary Examiner* — Edward Glick
*Assistant Examiner* — Anthony G Quash
(74) *Attorney, Agent, or Firm* — Innovations Counsel LLP

(57) ABSTRACT

A liquid crystal display device is provided. A liquid crystal display device comprising: a first substrate and a second substrate opposed to the first substrate; a liquid crystal layer interposed between the first substrate and the second substrate; a lower layer disposed on the first substrate and including at least one contact hole; and a spacer portion disposed on the lower layer, wherein the spacer portion includes a main spacer not overlapping the contact hole and an auxiliary spacer overlapping at least a portion of the contact hole, and a distance between the main spacer and the second substrate is smaller than a distance between the auxiliary spacer and the second substrate.

17 Claims, 18 Drawing Sheets

(56) References Cited

U.S. PATENT DOCUMENTS

2015/0092138 A1    4/2015  Kwak et al.

FOREIGN PATENT DOCUMENTS

| KR | 10-2011-0056961 | 5/2011 |
| KR | 10-2013-0137457 | 12/2013 |
| KR | 10-2015-0031127 | 3/2015 |
| KR | 10-2015-0039002 | 4/2015 |

* cited by examiner

LIQUID CRYSTAL DISPLAY DEVICE AND METHOD OF MANUFACTURING THE SAME

CROSS-REFERENCE TO RELATED APPLICATION

This application claims the priority and benefit of Korean Patent Application No. 10-2015-0001756 filed on Jan. 7, 2015 in the Korean Intellectual Property Office, the disclosure of which is incorporated herein by reference.

BACKGROUND

1. Field

The present inventive concept relates to a liquid crystal display device and a method of manufacturing the same.

2. Background

Liquid crystal display devices, one of flat panel display devices currently in widespread use, may be formed of two substrates provided with electrodes and a liquid crystal layer interposed between the substrates. In the liquid crystal display devices, liquid crystal molecules of the liquid crystal layer are rearranged by applying a voltage to the electrodes, such that the amount of light passing through the liquid crystal layer may be adjusted.

A distance of the liquid crystal layer between the two display panels is called 'a cell gap' and the cell cap may influence the overall operational characteristics of liquid crystal display devices such as a response speed, a contrast ratio, a viewing angle, luminance uniformity and the like. In the event that the cell gap is not uniform, an image may be unevenly displayed over the entire screen, thereby leading to defects in image quality. Thus, in order to maintain a uniform cell gap on the overall area of the substrate, a plurality of spacers may be formed on one side of the two substrates.

The plurality of spacers may include a main spacer substantially supporting the two substrates and an auxiliary spacer assisting the role of the main spacer. In particular, for simplification of a process, a light shielding member such as a black matrix, the main spacer, and the auxiliary spacer may be simultaneously formed. In the event that the light shielding member, the main spacer, and the auxiliary spacer are simultaneously formed as described above, it may be required to form a multi-step portion. However, it may be difficult to form a uniform multi-step portion by simply adjusting a transmittance.

SUMMARY

An aspect of the present inventive concept may provide a liquid crystal display device in which a step portion between a main spacer and an auxiliary spacer may be uniformly formed.

An aspect of the present inventive concept may also provide a method of manufacturing of a liquid crystal display device, in which a step portion between a main spacer and an auxiliary spacer may be uniformly formed using a contact hole.

An aspect of the present inventive concept may also provide a method of manufacturing of a liquid crystal display device, in which a degree of density of a main spacer and an auxiliary spacer may be controlled by adjusting a shape of a contact hole.

According to an aspect of the present inventive concept, there is provided a liquid crystal display device comprising: a first substrate and a second substrate opposed to the first substrate; a liquid crystal layer interposed between the first substrate and the second substrate; a lower layer disposed on the first substrate and including at least one recessed portion which includes a contact hole or a dummy contact hole; and a spacer portion disposed on the lower layer, wherein the spacer portion includes a main spacer not overlapping the recessed portion and an auxiliary spacer overlapping at least a portion of the recessed portion, and a distance between the main spacer and the second substrate is smaller than a distance between the auxiliary spacer and the second substrate.

The spacer portion has a predetermined width and extends in one direction, the predetermined width being smaller than that of the recessed portion.

The spacer portion, the main spacer and the auxiliary spacer are continuously disposed.

The liquid crystal display device further includes a light shielding member disposed on both sides of the spacer portion, wherein the distance between the auxiliary spacer and the second substrate is smaller than a distance between the light shielding member and the second substrate.

In the spacer portion, a material of the main spacer is identical to that of the auxiliary spacer.

In the spacer portion, a length of the auxiliary spacer is in proportion to a length of the recessed portion.

The lower layer includes a first recessed portion and a second recessed portion, each of the first recessed portion and the second recessed portion overlaps at least a portion of the auxiliary spacer, and a length of the first recessed portion is different from that of the second recessed portion.

In the spacer portion, the main spacer and the auxiliary spacer are spaced apart from each other, a light shielding member is interposed between the main spacer and the auxiliary spacer, and the distance between the auxiliary spacer and the second substrate is smaller than a distance between the light shielding member and the second substrate.

The lower layer includes a thin film transistor, at least a portion of the thin film transistor being exposed by the recessed portion.

The lower layer includes a gate line, and the one direction in which the spacer portion extends is substantially the same to a direction in which the gate line extends.

According to another aspect of the present inventive concept, there is provided a method of manufacturing a liquid crystal display device, the method comprising: forming a lower layer including a thin film transistor on a first substrate; forming at least one recessed portion in the lower layer, the recessed portion including a contact hole or a dummy contact hole; and forming a spacer portion on the lower layer, wherein the spacer portion includes a main spacer not overlapping the recessed portion and an auxiliary spacer overlapping at least a portion of the recessed portion, and wherein a height of the main spacer from a surface of the lower layer is greater than a height of the auxiliary spacer from the surface of the lower layer.

The main spacer and auxiliary spacer are simultaneously formed using a mask having a same transmittance.

The method further includes forming a light shielding member on the lower layer, wherein the main spacer, the auxiliary spacer, and the light shielding member are simultaneously formed using a two-tone mask including a full mask and a half mask and, the main spacer and the auxiliary spacer are formed using the full mask while the light shielding member is formed using the half mask.

The light shielding member is formed on both sides of the spacer portion and, wherein the height of the auxiliary spacer from the surface of the lower layer is greater than a height of the light shielding member from the surface of the lower layer.

In the spacer portion, the main spacer and the auxiliary spacer are spaced apart from each other, the light shielding member is interposed between the main spacer and the auxiliary spacer and, the height of the auxiliary spacer from the surface of the lower layer is greater than a height of the light shielding member from the surface of the lower layer.

The spacer portion has a predetermined width and extends in one direction, the predetermined width being smaller than that of the recessed portion.

In the spacer portion, the main spacer and the auxiliary spacer are continuously formed.

In the spacer portion, a material of the main spacer is identical to that of the auxiliary spacer.

The lower layer includes a first recessed portion and a second recessed portion, each of the first recessed portion and the second recessed portion overlaps at least a portion of the auxiliary spacer, and a length of the first recessed portion is different from that of the second recessed portion.

In the lower layer, a width of the first recessed portion is substantially the same to that of the second recessed portion.

BRIEF DESCRIPTION OF DRAWINGS

The above and other aspects, features and advantages of the present inventive concept will be more clearly understood from the following detailed description taken in conjunction with the accompanying drawings, in which.

DETAILED DESCRIPTION

Figure 1:
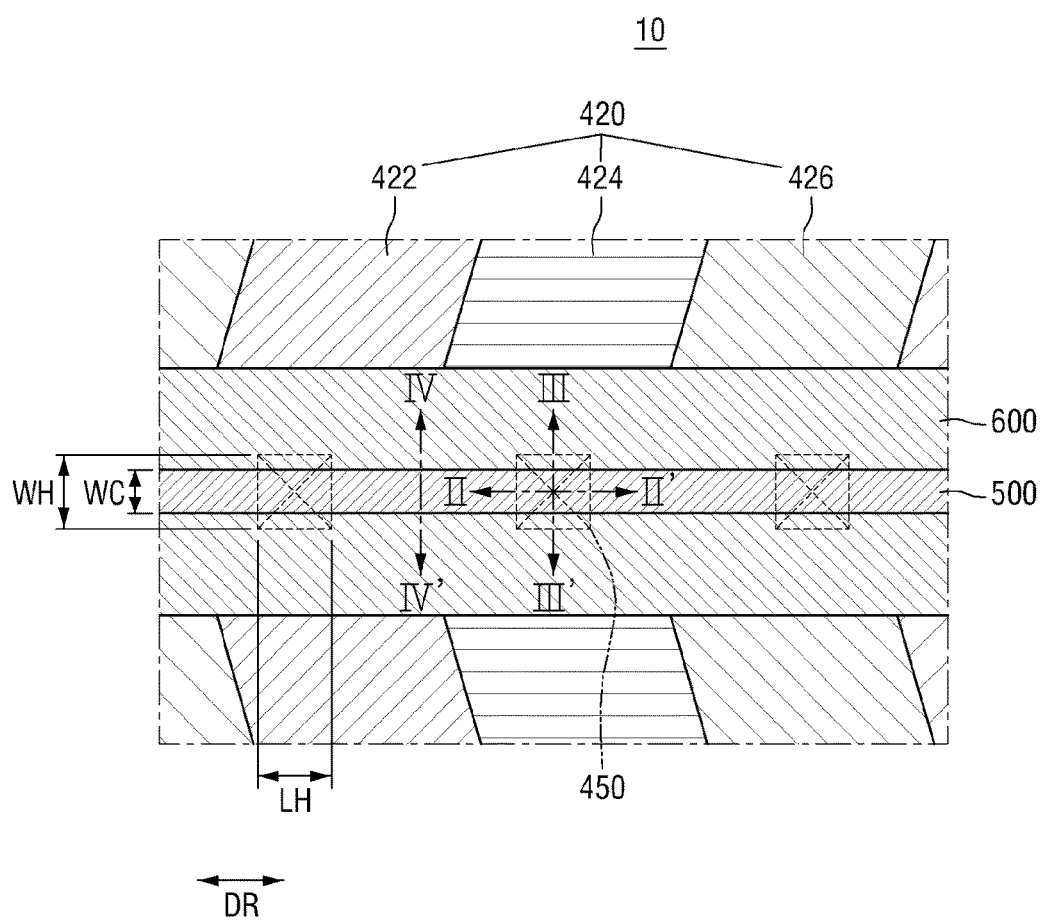
FIG. 1 is a plan view of a liquid crystal display device according to an exemplary embodiment of the present inventive concept.

Reference will now be made in detail to exemplary embodiments, examples of which are illustrated in the accompanying drawings, wherein like reference numerals refer to like elements throughout the specification. In this regard, the present exemplary embodiments may have different forms and should not be construed as being limited to the descriptions set forth herein. Accordingly, the exemplary embodiments are merely described below, by referring to the figures, to explain aspects of the present description.

The description that one element is connected to or coupled to another element includes both a case where the one element is directly connected to the another element or a case where another element is further interposed between the elements. However, the description that one element is directly connected or directly coupled to another element indicates that there is no further another element between the elements. The term "and/or" includes any and all combinations of one or more of the associated listed items.

A singular expression in the present specification also includes a plural expression. The terms "comprise" and/or "comprising" do not exclude the possibility of existence or addition of one or more other components, steps, operations, and/or devices.

Exemplary embodiments of the present inventive concept will now be described in detail with reference to the accompanying drawings.

The inventive concept may, however, be exemplified in many different forms and should not be construed as being limited to the specific embodiments set forth herein. Rather, these embodiments are provided so that this disclosure will be thorough and complete, and will fully convey the scope of the inventive concept to those skilled in the art.

In the drawings, the shapes and dimensions of elements may be exaggerated for clarity, and the same reference numerals will be used to designate the same or like elements throughout the specification.

Figure 2:
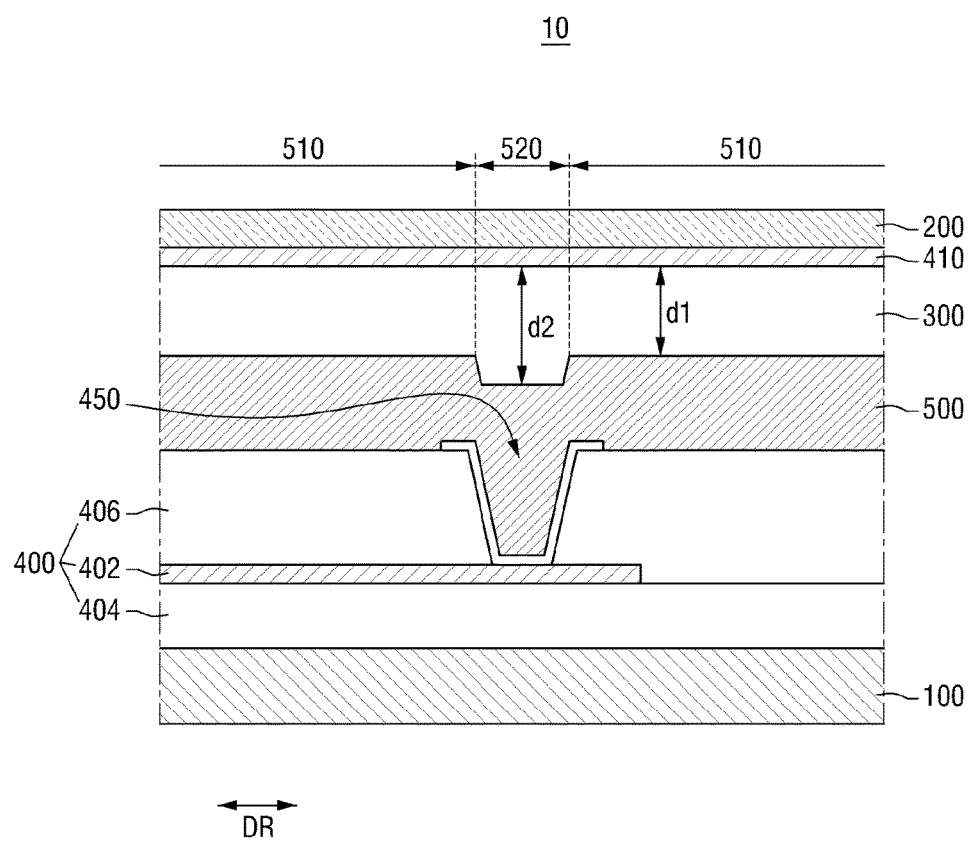
FIG. 2 is a cross-sectional view taken along line II-II' of FIG. 1.
Figure 3:
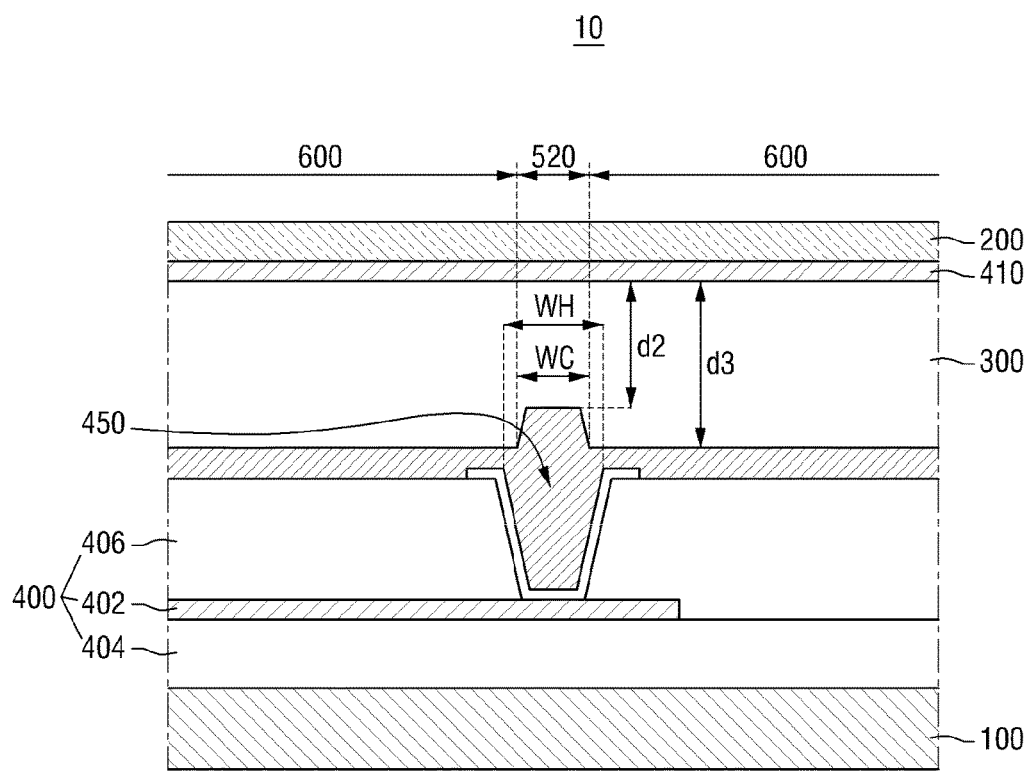
FIG. 3 is a cross-sectional view taken along line III-III' of FIG. 1.
Figure 4:
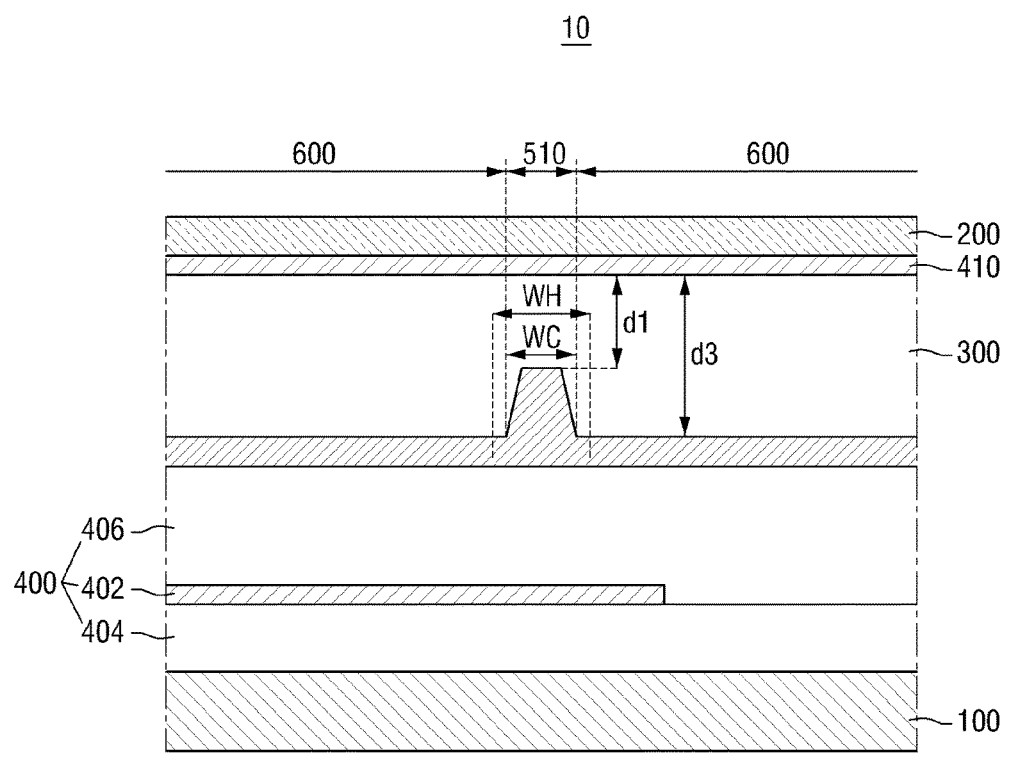
FIG. 4 is a cross-sectional view taken along line IV-IV' of FIG. 1.

FIG. 1 is a plan view of a liquid crystal display device according to an exemplary embodiment of the present inventive concept. FIG. 2 is a cross-sectional view taken along line II-II' of FIG. 1. FIG. 3 is a cross-sectional view taken along line III-III' of FIG. 1. FIG. 4 is a cross-sectional view taken along line IV-IV' of FIG. 1.

Referring to FIG. 1 through FIG. 4, a liquid crystal display device 10 according to an exemplary embodiment of the present inventive concept may include a first substrate 100, a second substrate 200, a liquid crystal layer 300, a lower layer 400, and a spacer portion 500.

Each of the first substrate 100 and the second substrate 200 may have a shape of a rectangular parallelepiped plate including one surface and an opposite surface opposed to the one surface. The first substrate 100 and the second substrate 200 may be disposed to be opposed to each other. One surface of the first substrate 100 may be flat, and various structures configuring the liquid crystal display device 10 may be formed on the flat one surface of the first substrate 100.

The first substrate 100 and the second substrate 200 may be transparent insulating substrates. The insulating substrate may be formed of glass, quartz, a polymer resin or the like. Examples of the polymer resin may include polyethersulphone (PES), polyacrylate (PA), polyarylate (PAR), polyetherimid (PEI), polyethylene napthalate (PEN), polyethylene terephthalate (PET), polyphenylene sulfide (PPS), polyallylate, polyimide (PI), polycarbonate (PC), cellulose triacetate (CAT or TAC), cellulose acetate propionate (CAP) or combinations thereof. In some exemplary embodiments, the insulating substrate may be a flexible substrate formed of a flexible material such as polyimide (PI).

The liquid crystal layer 300 may be interposed between the first substrate 100 and the second substrate 200. Although not illustrated, the liquid crystal layer 300 may contain liquid crystal molecules. Orientation of the liquid crystal molecules may be varied depending on an electric field formed by pixel electrodes 420 and a common electrode 410. As the orientation of the liquid crystal molecules is varied, luminance of light passing through the liquid crystal layer may be changed.

In some exemplary embodiments, as illustrated in FIGS. 2 through 4, the common electrode 410 may be disposed on one surface of the second substrate 200, but it is merely provided by way of example. The present inventive concept is not limited thereto.

In some exemplary embodiments, as illustrated in FIG. 1, the pixel electrodes 420 may be configured to include a first color pixel electrode 422, a second color pixel electrode 424, and a third color pixel electrode 426, but they are provided by way of example. The present inventive concept is not limited thereto.

The lower layer 400 may be disposed on the first substrate 100 and may include various structures configuring the liquid crystal display device 10. Although not illustrated, the lower layer 400 may include various devices for driving the liquid crystal display device 10, such as a thin film transistor, a pixel electrode, a common electrode, a gate line, a data line and the like. The thin film transistor may be configured to include a gate electrode, a source electrode, a drain electrode, a semiconductor layer, and an insulating layer. The lower layer 400 may include at least one recessed portion recessed from a surface of the lower layer 400, The recessed portion may include a contact hole 450 which exposes an underlying conductive layer such as a drain electrode 402.

The contact hole 450 may be through hole formed in an insulating layer 406 to expose an underlying conductive layer, as illustrated in FIGS. 2 through 3. As illustrated in FIGS. 1 through 3, the contact hole 450 may have a predetermined width WH and a predetermined length LH and may have a shape in which it is narrowed downwardly from the surface of the lower layer 400, but is merely provided by way of example. The shape of the contact hole 450 is not limited thereto. Although FIGS. 1 through 3 illustrates a case in which a cross-sectional shape of the contact hole 450 is angulated, but the cross-sectional shape of the contact hole 450 is not limited thereto. A cross-section of the contact hole 450 may have a curved line.

The contact hole 450 may expose various structures configuring the liquid crystal display device 10. For example, at least a portion of the thin film transistor may be exposed by the contact hole 450. More specifically, as illustrated in FIGS. 2 and 3, a portion of a drain electrode 402 configuring the thin film transistor may be exposed by the contact hole 450, but which may be merely provided by way of example. The present inventive concept is not limited to a case in which the contact hole 450 may allow a portion of the drain electrode 402 to be exposed. In addition, in the exemplary embodiment of FIGS. 2 through 4, a case in which the drain electrode 402 is interposed between insulating layers 404 and 406 is exemplified, but the present inventive concept is not limited thereto.

The spacer portion 500 may be provided to maintain a distance between the first substrate 100 and the second substrate 200 and may be disposed on the lower layer 400. The spacer portion 500 may include a main spacer 510 and an auxiliary spacer 520. The main spacer 510 may not overlap the contact hole 450, and at least a portion of the auxiliary spacer 520 may overlap the contact hole 450. A distance d1 between the main spacer 510 and the common electrode 410 disposed on the second substrate 200 may be smaller than a distance between the auxiliary spacer 520 and the common electrode 410 disposed on the second substrate 200. The common electrode 410 may be disposed on the second substrate 200 at a uniform thickness. That is, a distance between the main spacer 510 and the second substrate 200 may be smaller than a distance between the auxiliary spacer 520 and the second substrate 200.

Within the liquid crystal layer 300, the main spacer 510 may be disposed to be relatively adjacent to the second substrate 200 as compared to the auxiliary spacer 520, a distance between the first substrate 100 and the second substrate 200 may be primarily maintained by the main spacer 510. In the event that the main spacer 510 may inappropriately function, the distance between the first substrate 100 and the second substrate 200 may be secondarily maintained by the auxiliary spacer 520.

As illustrated in FIGS. 1 and 2, the spacer portion 500 may have a predetermined width WC and may extend in one direction DR. That is, a shape of the spacer portion 500 may be a linear shape. The width WC of the spacer portion 500 may be smaller than the width WH of the contact hole 450 as illustrated in FIGS. 1, 3, and 4. However, the present inventive concept is not limited thereto and the width WC of the spacer portion 500 may be greater than or equal to the width WH of the contact hole 450.

The spacer portion 500 may be configured to include the main spacer 510 and the auxiliary spacer 520 continuously disposed on the lower layer 400. For example, as illustrated in FIG. 2, the main spacer 510 and the auxiliary spacer 520 may be formed to be integrated with each other, and the main spacer 510 and the auxiliary spacer 520 are alternately disposed. More specifically, the auxiliary spacer 520 may be disposed on a region of the lower layer 400 in which the contact hole 450 is formed, and the main spacer 510 may be disposed on the remaining region of the lower layer 400; however, such a case is merely provided by way of example, and the present inventive concept is not limited to a case in which the main spacer 510 and the auxiliary spacer 520 are integrally formed.

As illustrated in FIGS. 1, 3 and 4, light shielding members 600 may be disposed on both sides the space portion 500. The light shielding members 600 may serve to prevent light leakage between the pixel electrodes 420. The light shielding members may extend in one direction DR. For example, as illustrated in FIG. 1, the light shielding members 600 may be formed to extend in the same direction DR as that of the spacer portion 500. As illustrated in FIGS. 1, 3 and 4, the light shielding members 600 may be divided into two portions by the spacer portion 500, but which may be provided by way of example. A shape of the light shielding member 600 is not limited thereto.

Each of the light shielding members 600 may include a planar surface having a substantially uniform height. Referring to FIGS. 3 and 4, a distance d3 between the light shielding member 600 and the common electrode 410 disposed on the second substrate 200 may be greater than the distance d2 between the auxiliary spacer 520 and the common electrode 410 disposed on the second substrate 200. That is, a distance between the light shielding member 600 and the second substrate 200 may be greater than the distance between the auxiliary spacer 520 and the second substrate 200, and the distance between the auxiliary spacer 520 and the second substrate 200 may be greater than the distance between the main spacer 510 and the second substrate 200.

The spacer portion 500 and the light shielding member 600 may be formed of the same material according to a manufacturing process thereof. More specifically, as the spacer portion 500 and the light shielding member 600 are simultaneously manufactured through the same manufacturing process, they are formed of the same material. That is, a material of the main spacer 510 may be identical to that of the auxiliary spacer 520 and the light shielding member 600. In addition, as the spacer portion 500 and the light shielding member 600 are simultaneously manufactured through the same manufacturing process, they are integrally formed. However, the present inventive concept is not limited thereto, a material of the main spacer 510 may be different from that of the auxiliary spacer 520. Moreover, a material of the main spacer 510 may be different from that of the auxiliary spacer 520.

In some exemplary embodiments, the contact hole 450 may be formed to have a uniform shape as illustrated in FIG. 1. However, the shape of the contact hole 450 is not limited thereto and the contact hole 450 may be formed in various shapes.

Figure 5:
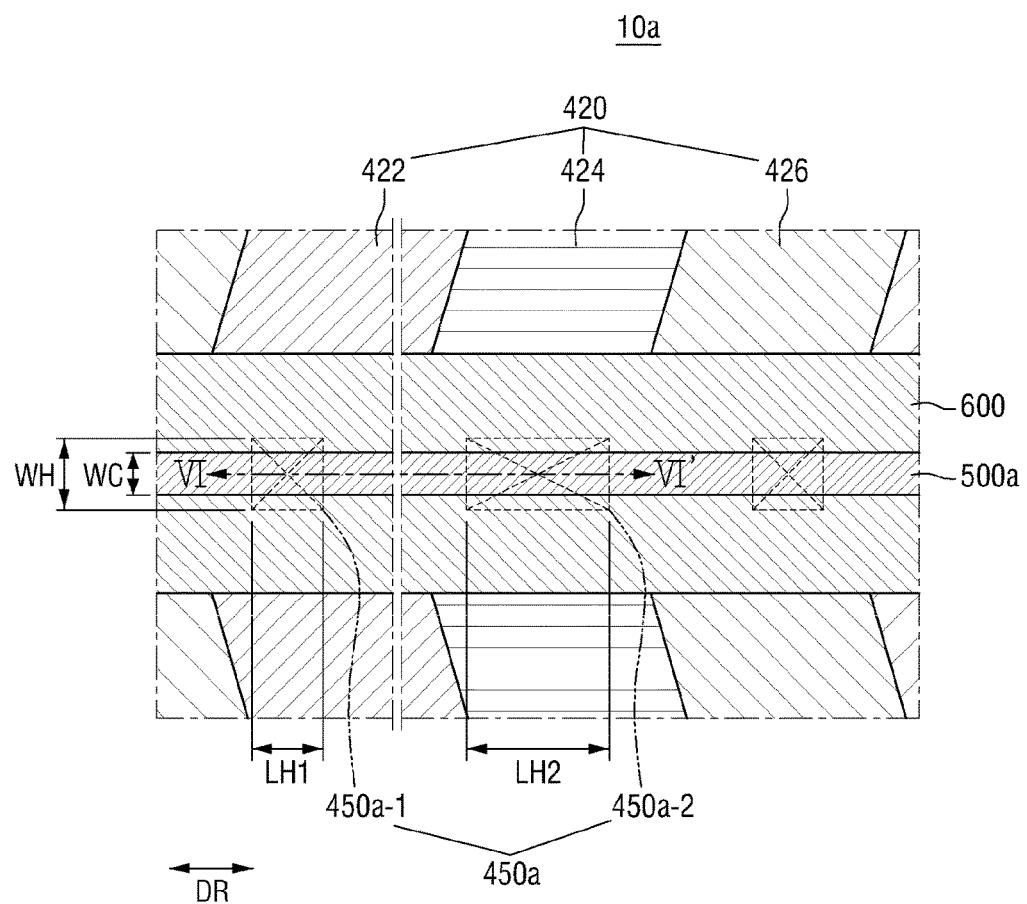
FIG. 5 is a plan view of a liquid crystal display device according to another exemplary embodiment of the present inventive concept.
Figure 6:
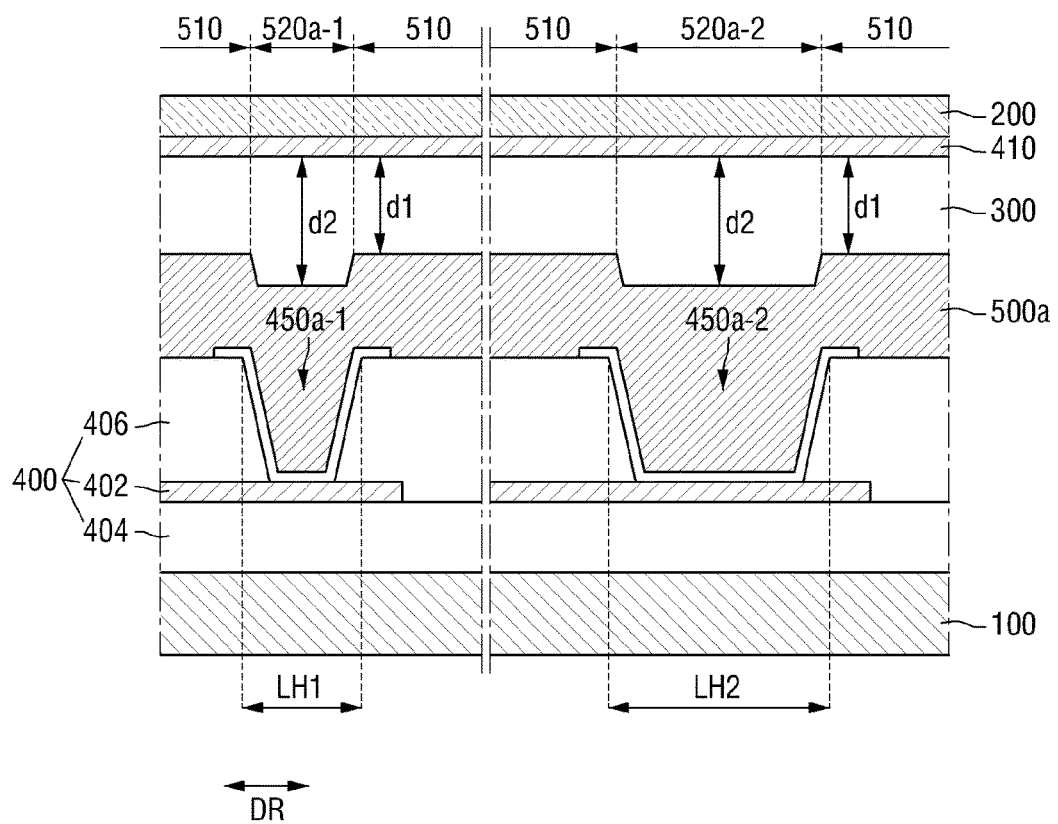
FIG. 6 is a cross-sectional view taken along line VI-VI' of FIG. 5.

FIG. 5 is a plan view of a liquid crystal display device according to another exemplary embodiment of the present inventive concept. FIG. 6 is a cross-sectional view taken along line VI-VI' of FIG. 5.

Referring to FIGS. 5 and 6, a liquid crystal display device 10*a* according to another exemplary embodiment of the present inventive concept is different from the liquid crystal display device 10 described in the foregoing exemplary embodiment of FIGS. 1 through 4, in terms of contact holes 450*a* and a spacer portion 500*a*, and other configurations thereof are identical to or similar to those of the liquid crystal display device 10. Hereinafter, except for overlapped portions therebetween, differences according to another exemplary embodiment of the present inventive concept will be described.

In the exemplary embodiment, the contact holes 450*a* may include a first contact hole 450*a*-1 and a second contact hole 450*a*-2. A width WH of the first contact hole 450*a*-1 may be substantially same to a width WH of the second contact hole 450*a*-2. A length LH1 of the first contact hole 450*a*-1 may be different from a length LH2 of the second contact hole 450*a*-2. Specifically, as illustrated in FIG. 5, the length LH1 of the first contact hole 450*a*-1 may be smaller than the length LH2 of the second contact hole 450*a*-2.

The spacer portion 500*a* may include the main spacers 510 and auxiliary spacers 520*a*-1 and 520*a*-2 continuously and alternatingly disposed on the lower layer 400. The main spacer 510 may not overlap the contact holes 450*a*. The auxiliary spacers 520*a*-1 and 520*a*-2 may include a first auxiliary spacer 520*a*-1 and a second auxiliary spacer 520*a*-2. At least portions of the auxiliary spacers 520*a*-1 and 520*a*-2 may overlap the contact holes 450*a*. For example, as illustrated in FIG. 6, at least a portion of the first auxiliary spacer 520*a*-1 may overlap a first contact hole 450*a*-1, and at least a portion of the second auxiliary spacer 520*a*-2 may overlap a second contact hole 450*a*-2.

The length of the first auxiliary spacer 520*a*-1 and the length of the second auxiliary spacer 520*a*-2 may be changed depending on lengths of the contact holes 450*a* overlapping the spacers. For example, as illustrated in FIG. 6, the length of the first auxiliary spacer 520*a*-1 overlapping the first contact hole 450*a*-1 may be smaller than the length of the second auxiliary spacer 520*a*-2 overlapping the second contact hole 450*a*-2. Specifically, the length LH1 of the first contact hole 450*a*-1 may be smaller than the length LH2 of the second contact hole 450*a*-2, such that the length of the first auxiliary spacer 520*a*-1 overlapping the first contact hole 450*a*-1 may be smaller than the length of the second auxiliary spacer 520*a*-2 overlapping the second contact hole 450*a*-2. That is, the lengths of the first and second auxiliary spacers 520*a*-1 and 520*a*-2 may be in proportion to the lengths of the contact holes 450*a* they overlap.

The length of the first auxiliary spacer 520*a*-1 may be substantially equal to or less than the length LH1 of first contact hole 450*a*-1. The length of the second auxiliary spacer 520*a*-2 may be equal to or less than the length LH2 of the second contact hole 450*a*-2. However, the present inventive concept is not limited thereto.

The exemplary embodiment illustrates a case in which the contact holes 450*a* includes the first contact hole 450*a*-1 and the second contact hole 450*a*-2 having the same widths and different lengths, but shapes of the contact holes 450*a* are not limited thereto. That is, the first contact hole 450*a*-1 and the second contact hole 450*a*-2 may have different widths. In addition, the contact holes 450*a* may further include at least one contact hole having a shape different from those of the first contact hole 450*a*-1 and the second contact hole 450*a*-2.

In some exemplary embodiments, at least a portion of the thin film transistor may be exposed by the contact hole 450 of FIGS. 1 through 4 and the contact holes 450*a* of FIGS. 1 through 6, as illustrated in FIGS. 1 through 6. However, shapes of the contact holes are not limited to those described as above and the contact holes may be implemented to have a dummy contact hole which does not expose underlying conductive layer for forming an electrical contact.

Figure 7:
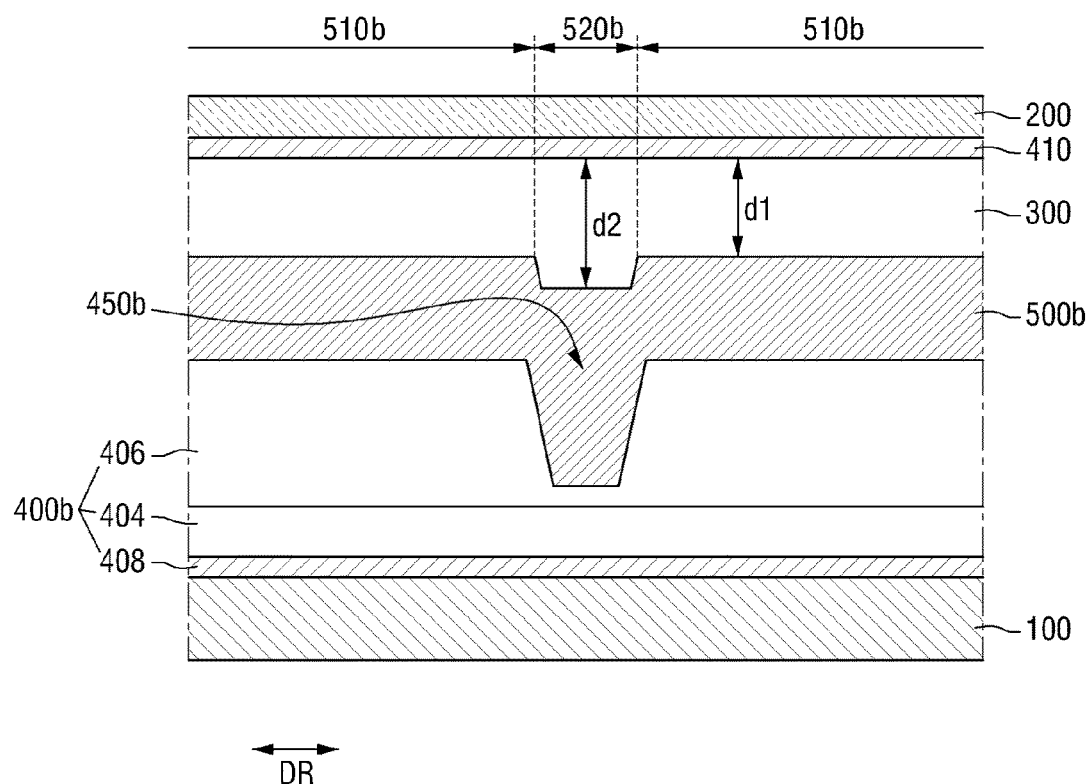
FIG. 7 is a cross-sectional view of a liquid crystal display device according to another exemplary embodiment of the present inventive concept, taken along line II-II' of FIG. 1.

FIG. 7 is a cross-sectional view of a liquid crystal display device according to another exemplary embodiment of the present inventive concept, taken along line II-II' of FIG. 1.

Referring to FIG. 7, a liquid crystal display device 10*b* according to another exemplary embodiment of the present inventive concept is different from the liquid crystal display device 10 described in the foregoing exemplary embodiment of FIGS. 1 through 4, in terms of a contact hole 450*b*, a spacer portion 500*b*, and a lower layer 400*b* and other configurations thereof are identical to or similar to those of the liquid crystal display device 10. Hereinafter, except for overlapped portions therebetween, differences according to another exemplary embodiment of the present inventive concept will be described.

The lower layer 400*b* may include various devices for driving the liquid crystal display device 10*b*. For example, as illustrated in FIG. 7, the lower layer 400*b* may have a structure in which a gate line 408, a first insulating layer 404, and a second insulating layer 406 are sequentially stacked. The gate line 408 may extend in one direction DR.

The lower layer 400*b* may include a recessed portion recessed from a surface of the lower layer 400, the recessed portion may include the contact hole 450*b*, a dummy contact hole which does not expose an underlying conductive layer. That is, the dummy contact hole 450*b* may not be a through hole to expose an underlying conductive layer for forming an electrical contact with the underlying conductive layer but a recessed portion recessed from the surface of the second insulating layer 406 by removing the second insulating layer 406 on a predetermined portion corresponding to the auxiliary spacer 520*b*. As illustrated in FIG. 7, the dummy contact hole 450*b* may be formed to be recessed in a surface of the second insulating layer 406.

The spacer portion 500*b* may include a main spacer 510*b* and an auxiliary spacer 520*b* consecutively formed on the lower layer 400*b*. The main spacer 510*b* may not overlap the dummy contact hole 450*b*. At least a portion of the auxiliary spacer 520*b* may overlap the dummy contact hole 450*b*. As illustrated in FIG. 7, the main spacer 510*b* and the auxiliary spacer 520b may be formed to be integrated with each other, and the main spacer 510b and the auxiliary spacer 520b may be alternately disposed.

The spacer portion 500b may be formed to extend in one direction DR as illustrated in FIG. 7. That is, the spacer portion 500b has a linear shape. A direction in which the spacer portion 500b extends may be substantially same to a direction in which the gate line 408 extends; however, it is merely provided by way of example and an extension direction of the spacer portion 500b is not limited thereto.

In some exemplary embodiments, the spacer portion 500 of FIGS. 1 through 4, the spacer portion 500a of FIGS. 5 and 6, and the spacer portion 500b of FIG. 7 may be implemented by consecutively disposing the main spacer and the auxiliary spacer; however, which is merely provided by way of example. The main spacer and the auxiliary spacer may be discontinuously disposed. That is, the main spacer and the auxiliary spacer may be spaced apart from each other.

Figure 8:
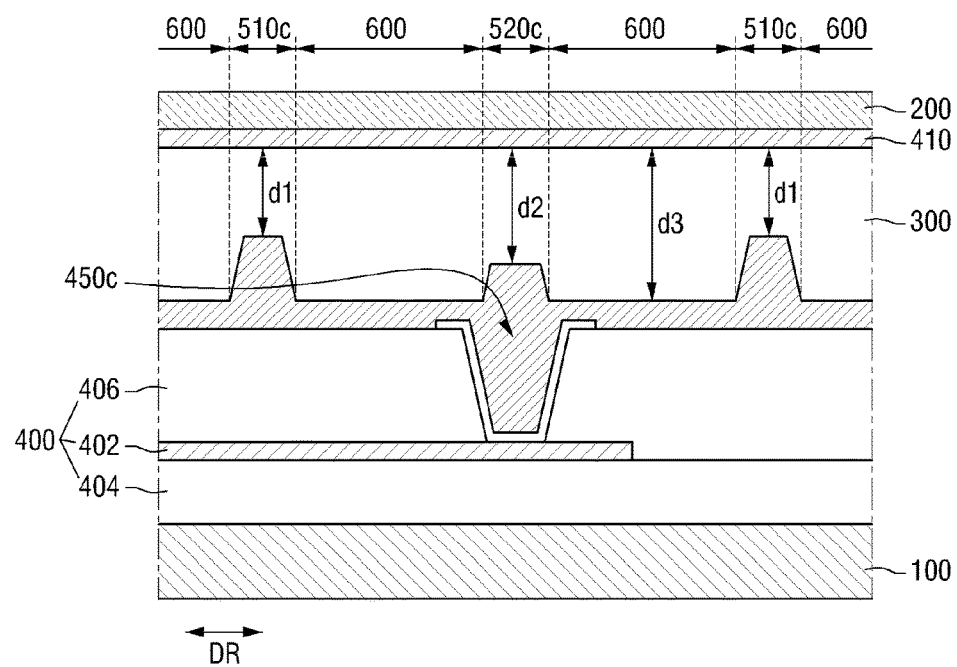
FIG. 8 is a cross-sectional view of a liquid crystal display device according to another exemplary embodiment of the present inventive concept, taken along line II-II' of FIG. 1.
Figure 9:
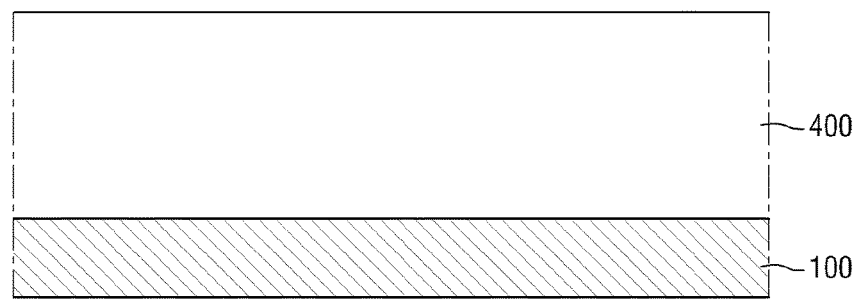
FIG. 9, 10, 11, 12, 13, 14 and FIG. 15 are views illustrating a method of manufacturing a liquid crystal display device according to an exemplary embodiment of the present inventive concept.

FIG. 8 is a cross-sectional view of a liquid crystal display device according to another exemplary embodiment of the present inventive concept, taken along line II-II' of FIG. 1.

Referring to FIG. 8, a liquid crystal display device 10c according to another exemplary embodiment of the present inventive concept is different from the liquid crystal display device 10 described in the foregoing exemplary embodiment of FIGS. 1 through 4, in terms of a spacer configuration, and other configurations thereof are identical to or similar to those of the liquid crystal display device 10. Hereinafter, except for overlapped portions therebetween, differences according to another exemplary embodiment of the present inventive concept will be described.

In the exemplary embodiment, a spacer may include a main spacer 510c and an auxiliary spacer 520c discontinuously disposed on the lower layer 400. That is, the main spacer 510c and the auxiliary spacer 520c may be spaced apart from each other. The main spacer 510c may not overlap a contact hole 450c. At least a portion of the auxiliary spacer 520c may overlap the contact hole 450c. A distance d1 between the main spacer 510c and the common electrode 410 disposed on the second substrate 200 may be smaller than a distance d2 between the auxiliary spacer 520c and the common electrode 410 disposed on the second substrate 200.

As illustrated in FIG. 8, the main spacer 510c and the auxiliary spacer 520c may be discontinuously disposed in one direction DR, and the light shielding member 600 may be disposed between the main spacer 510c and the auxiliary spacer 520c. The main spacer 510c, the auxiliary spacer 520c and the light shielding member 600 may be integrally formed.

Hereinafter, a method of manufacturing a liquid crystal display device according to an exemplary embodiment of the present inventive concept will be described.

FIG. 9 through FIG. 15 are views illustrating a method of manufacturing a liquid crystal display device according to an exemplary embodiment of the present inventive concept.

The method of manufacturing a liquid crystal display device according to an exemplary embodiment of the present inventive concept may include a series of processes performed in time sequence. First referring to FIG. 9, the lower layer 400 may be formed on the first substrate 100. Although not illustrated, the lower layer 400 may include various devices for driving the liquid crystal display device, such as a thin film transistor, a pixel electrode, a common electrode, a gate line, a data line and the like.

Figure 10:
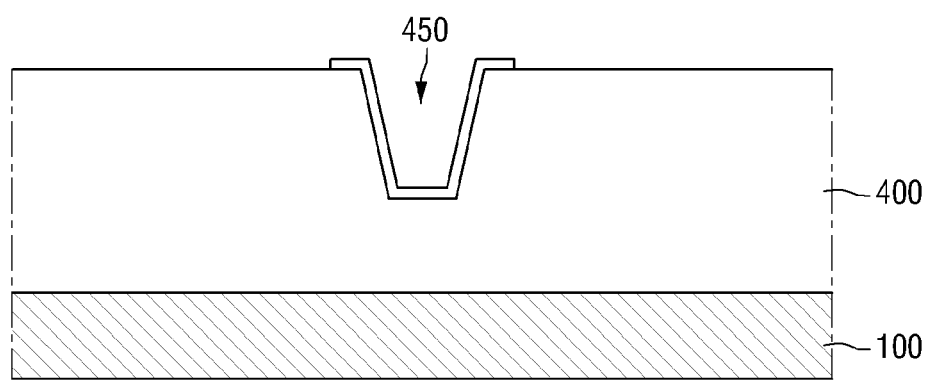

Then, referring to FIG. 10, the contact hole 450 may be formed in the surface of the lower layer 400. Although not illustrated, the contact hole 450 may be realized to allow at least a portion of the thin film transistor to be exposed or may be implemented as a dummy contact hole. After forming the contact hole 450, a pattern, for example a conductive layer pattern 800, to contact an underlying conductive layer (not shown) is formed.

Figure 11:
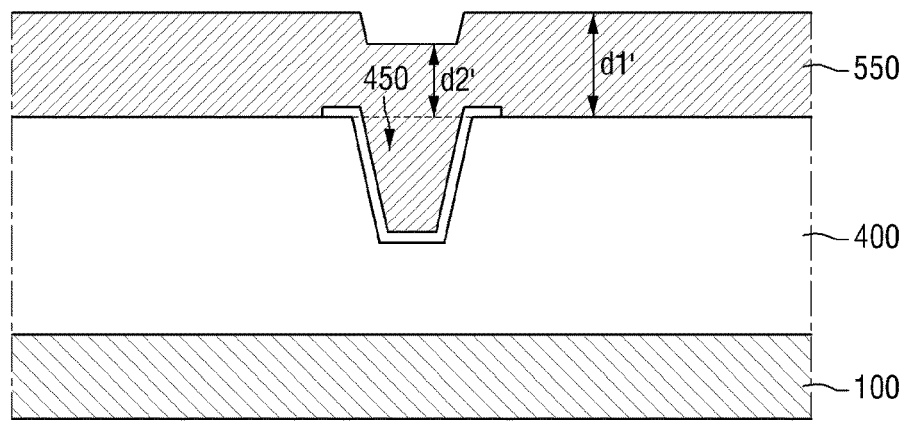

Next, referring to FIG. 11, photoresist, material for forming the spacer portion 500 and the light shielding member 600, may be applied to the lower layer 400 including the contact hole 450 to thereby form a photoresist layer 550. The photoresist layer 550 may be formed through a spin coating method, a spraying method, or a dipping method. The photoresist may be positive photoresist or negative photoresist having light shielding characteristic.

As illustrated in FIG. 11, in a surface of the photoresist layer 550, a portion thereof overlapping the contact hole 450 may be provided with a recessed portion and/or a step portion, and the remaining portion thereof may be flat. Although FIG. 11 illustrates a case in which a cross-sectional shape of the step portion is angulated, but the cross-sectional shape of the step portion is not limited thereto. A cross-section of the step portion may have a curve line.

Next, a photomask 700 may be positioned on the photoresist layer 550. The photomask 700 may be fabricated based on shapes of the spacer portion 500 and the light shielding member 600 to be formed.

Figure 12:
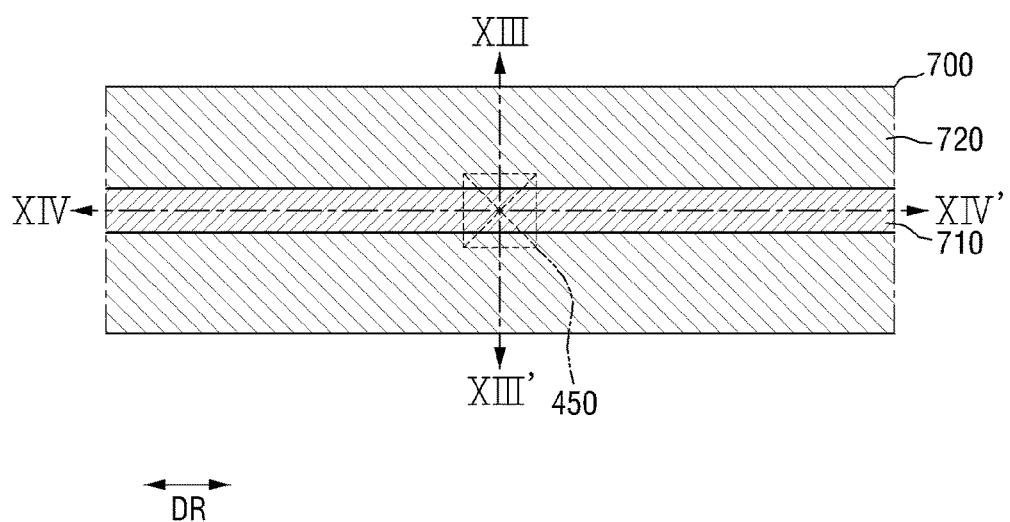

FIG. 12 illustrates a shape of the photomask 700 when viewed in a plan view in a state in which the photomask 700 is disposed on the photoresist layer 550.

Referring to FIG. 12, the photomask 700 may be a two-tone mask including a full mask 710 and a half mask 720. A transmittance of the half mask 720 may be different from that of the full mask 710. A shape of the full mask 710 may correspond to the shape of the spacer portion 500 to be formed, while a shape of the half mask 720 may correspond to the shape of the light shielding member 600 to be formed. That is, the spacer portion 500 may be formed through the full mask 710, and the light shielding member 600 may be formed through the half mask 720. The spacer portion 500 may include the main spacer 510 and the auxiliary spacer 520. In the case that the spacer portion 500 is formed to extend in one direction DR, the full mask 710 may also be formed to extend in one direction DR as illustrated in FIG. 12.

Then, light exposure of the photoresist layer 550 may be performed through the photomask 700 using an exposure device, and the photoresist layer 550 may be developed, such that the spacer portion 500 and the light shielding member 600 may be formed on the lower layer 400.

Figure 13:
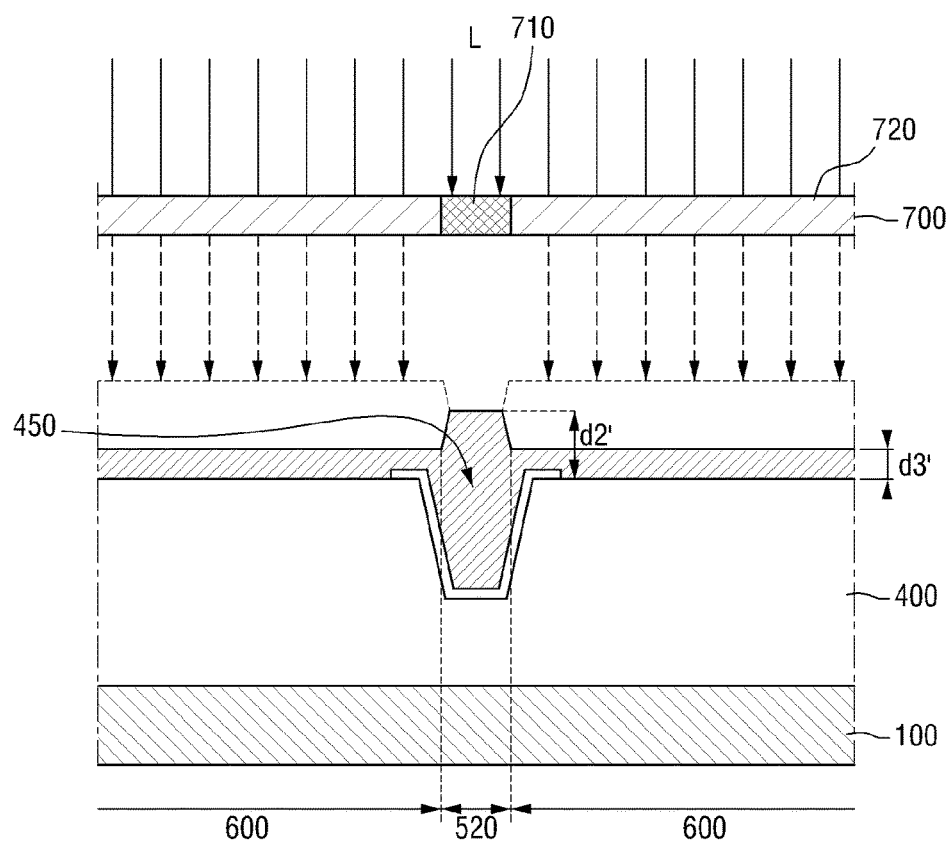
Figure 14:
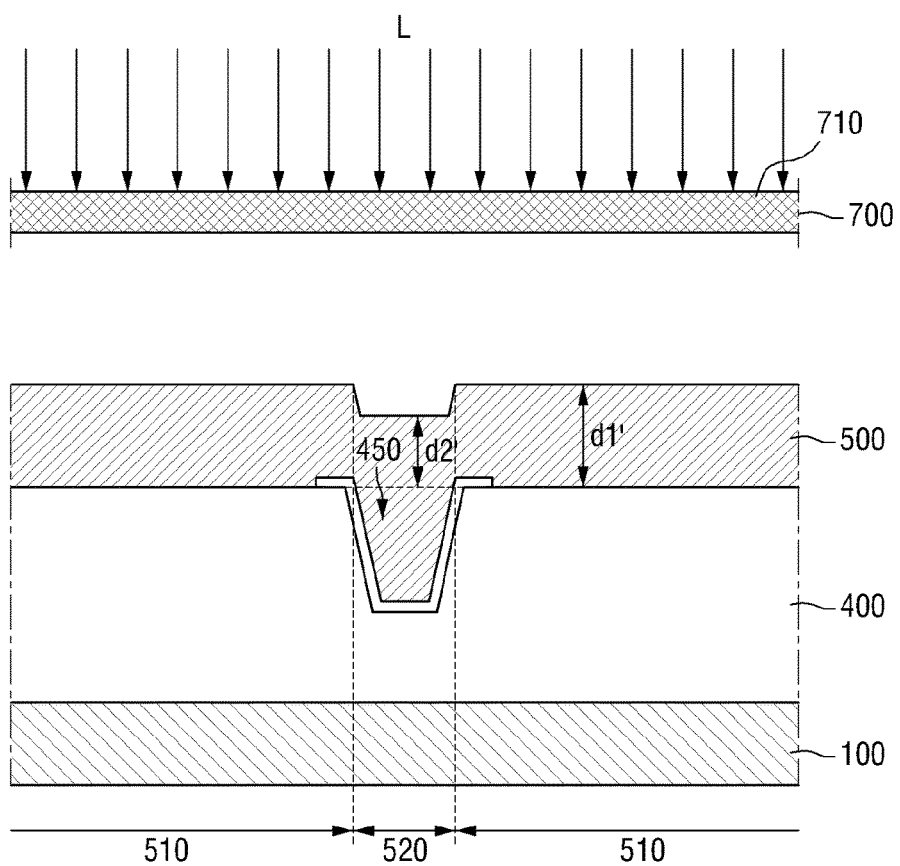

FIG. 13 is a cross-sectional view taken along line XIII-XIII' of FIG. 12. FIG. 14 is a cross-sectional view taken along line XIV-XIV' of FIG. 12.

Referring to FIGS. 13 and 14, the spacer portion 500 and the light shielding member 600 each having a shape extending in one direction DR may be simultaneously formed, using the photomask 700 including the full mask 710 and the half mask 720. More specifically, the main spacer 510 and the auxiliary spacer 520 may be formed using the full mask 710, and the light shielding member 600 may be formed using the half mask 720. That is, the main spacer 510 and the auxiliary spacer 520 may be simultaneously formed using a common mask having a same transmittance.

As illustrated in FIG. 14, the main spacer 510 and the auxiliary spacer 520 may be continuously disposed on the lower layer 400. More specifically, the main spacer 510 and the auxiliary spacer 520 may be formed to be disposed in an alternate manner. The light shielding member 600 may be formed on both sides of the spacer portion 500.

In the method of manufacturing a liquid crystal display device according to an exemplary embodiment of the present inventive concept, a step portion may be uniformly formed between the main spacer 510 and the auxiliary spacer 520 through the full mask 710 without a separate control of transmittance, using the recessed portion/the step portion formed in a portion overlapping the contact hole 450, in the surface of the photoresist layer 550.

A height d1' of the main spacer 510 from a surface of the lower layer 400 in which the contact hole 450 is not formed may be greater than a height d2' of the auxiliary spacer 520 from the surface of the lower layer 400 in which the contact hole 450 is formed.

In addition, the height d2' of the auxiliary spacer 520 from the surface of the lower layer 400 may be greater than a height d3' of the light shielding member 600 from the surface of the lower layer 400 in which the contact hole 450 is not formed.

That is, the height d1' of the main spacer 510 may be greater than the height d2' of the auxiliary spacer 520, and the height d2' of the auxiliary spacer 520 may be greater than the height d3' of the light shielding member 600.

The exemplary embodiment exemplifies a case in which the spacer portion 500 and the light shielding member 600 are simultaneously formed using the photomask 700 including the full mask 710 and the half mask 720, but is not limited thereto. The spacer portion 500 and the light shielding member 600 may not be formed simultaneously.

Next, the liquid crystal layer 300 and the second substrate 200 may be formed on the spacer portion 500 and the light shielding member 600.

Figure 15:
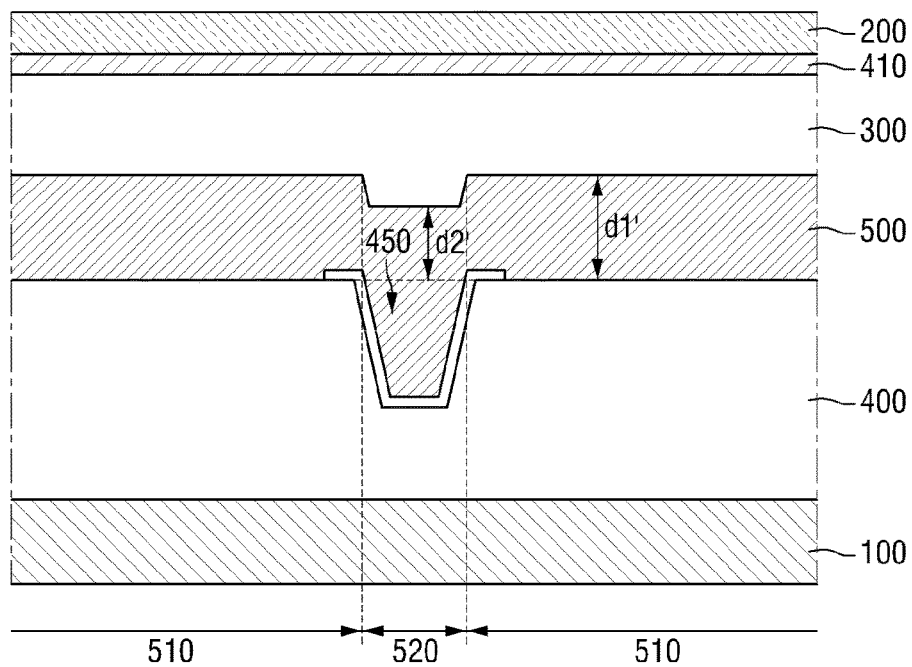

Referring to FIG. 15, after forming the spacer portion 500 and the light shielding member 600 on the lower layer 400, the liquid crystal layer 300 and the second substrate 200 may be sequentially formed on the spacer portion 500 and the light shielding member 600. The common electrode 410 may be formed on one surface of the second substrate 200 as illustrated in FIG. 15, but which is merely provided by way of example. The present inventive concept is not limited thereto.

Hereinafter, a method of manufacturing a liquid crystal display device according to another exemplary embodiment of the present inventive concept will be described FIG. 16 through FIG. 19 are views illustrating a method of manufacturing a liquid crystal display device according to another exemplary embodiment of the present inventive concept.

The method of manufacturing a liquid crystal display device according to another exemplary embodiment of the present inventive concept may be different from the method of manufacturing a liquid crystal display device according to the foregoing exemplary embodiment of the present inventive concept, in terms of a process of forming the spacer portion 500, and other processes thereof may be substantially identical to those of the foregoing exemplary embodiment of the present inventive concept.

That is, the method of manufacturing a liquid crystal display device according to another exemplary embodiment of the present inventive concept may include a series of processes performed in time sequence. The method of manufacturing a liquid crystal display device according to another exemplary embodiment of the present inventive concept may include: forming the lower layer 400 on the first substrate 100; forming the contact hole 450 in the lower layer 400; and forming the photoresist layer 550 on the lower layer 400 in which the contact hole 450 is formed, and the above processes may be performed in substantially the same manner as that described with reference to FIGS. 9 through 11.

Figure 16:
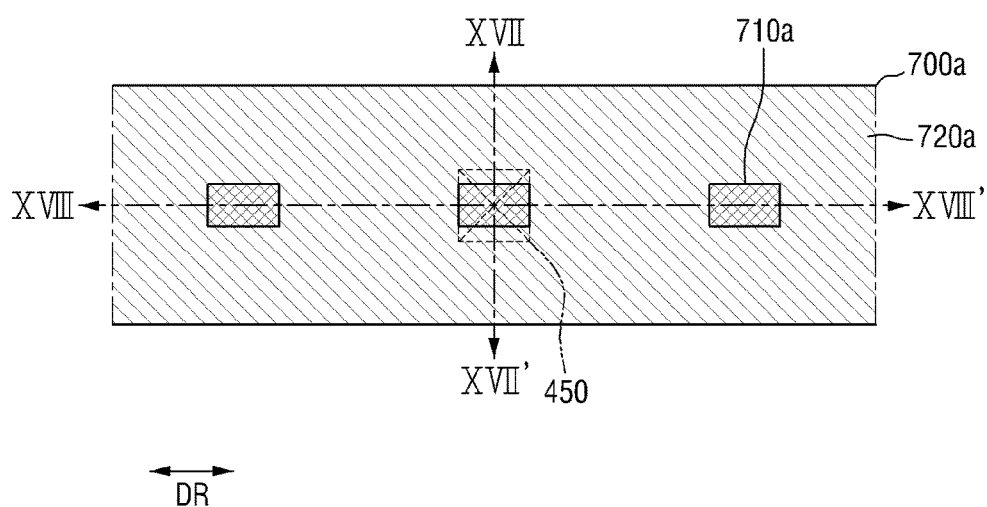
FIG. 16, 17, 18 and FIG. 19 are views illustrating a method of manufacturing a liquid crystal display device according to another exemplary embodiment of the present inventive concept.

FIG. 16 illustrates a shape of a photomask 700a when viewed in a plan view in a state in which the photomask 700a is disposed on the photoresist layer 550.

After forming the photoresist layer 550 on the lower layer 400 in which the contact hole 450 is formed, the photomask 700a may be disposed on the photoresist layer 550. The photomask 700a may be manufactured based on shapes of the spacer portion 500 and the light shielding member 600 to be formed.

Referring to FIG. 16, the photomask 700a may be a two-tone mask including a full mask 710a and a half mask 720a. A transmittance of the half mask 720a may be different from that of the full mask 710a. A shape of the full mask 710a may correspond to the shape of the spacer portion 500 to be formed, while a shape of the half mask 720a may correspond to the shape of the light shielding member 600 to be formed. That is, the spacer portion 500 may be formed on a region corresponding to the full mask 710a, and the light shielding member 600 may be formed on a region corresponding to the half mask 720a. The spacer portion 500 may include the main spacer 510 and the auxiliary spacer 520. In the case that the main spacer 510 and the auxiliary spacer 520 are discontinuously disposed, that is, when the main spacer 510 and the auxiliary spacer 520 are spaced apart from each other in one direction DR, the full mask 710a may be formed in a plurality of islands formed and arranged in the direction DR.

Then, light exposure of the photoresist layer 550 may be performed through the photomask 700a using an exposure device (not shown), and the photoresist layer 550 may be developed, such that the spacer portion 500 and the light shielding member 600 may be formed on the lower layer 400.

Figure 17:
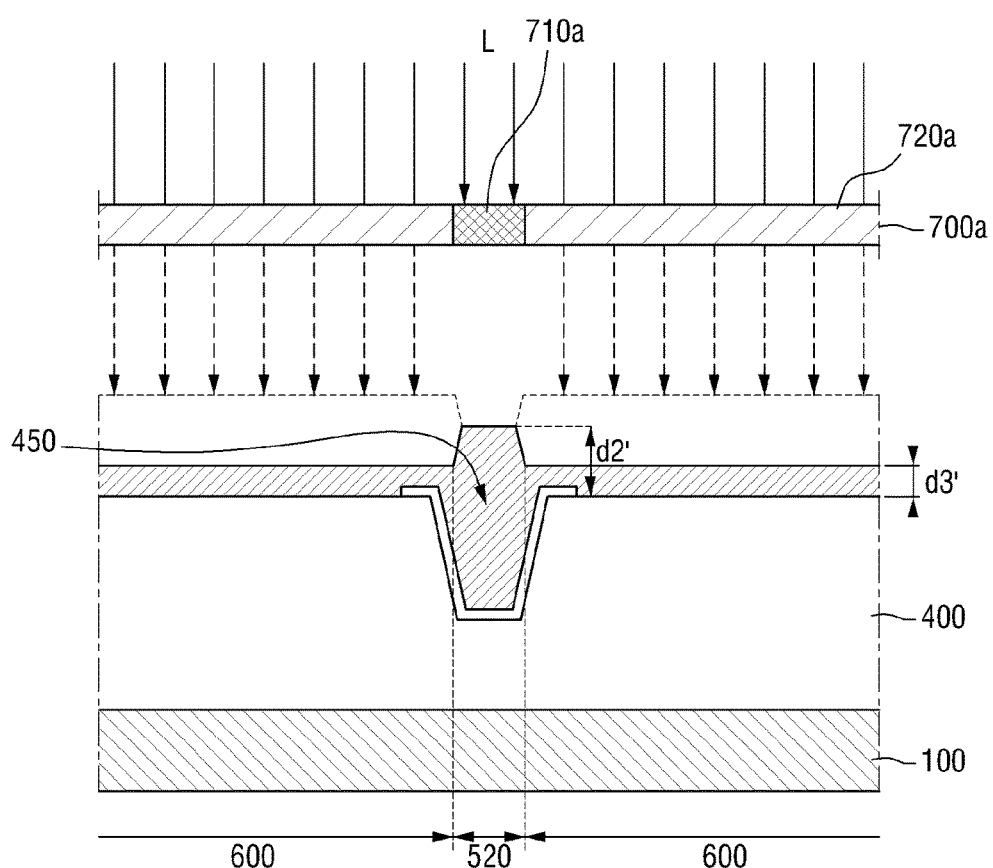
Figure 18:
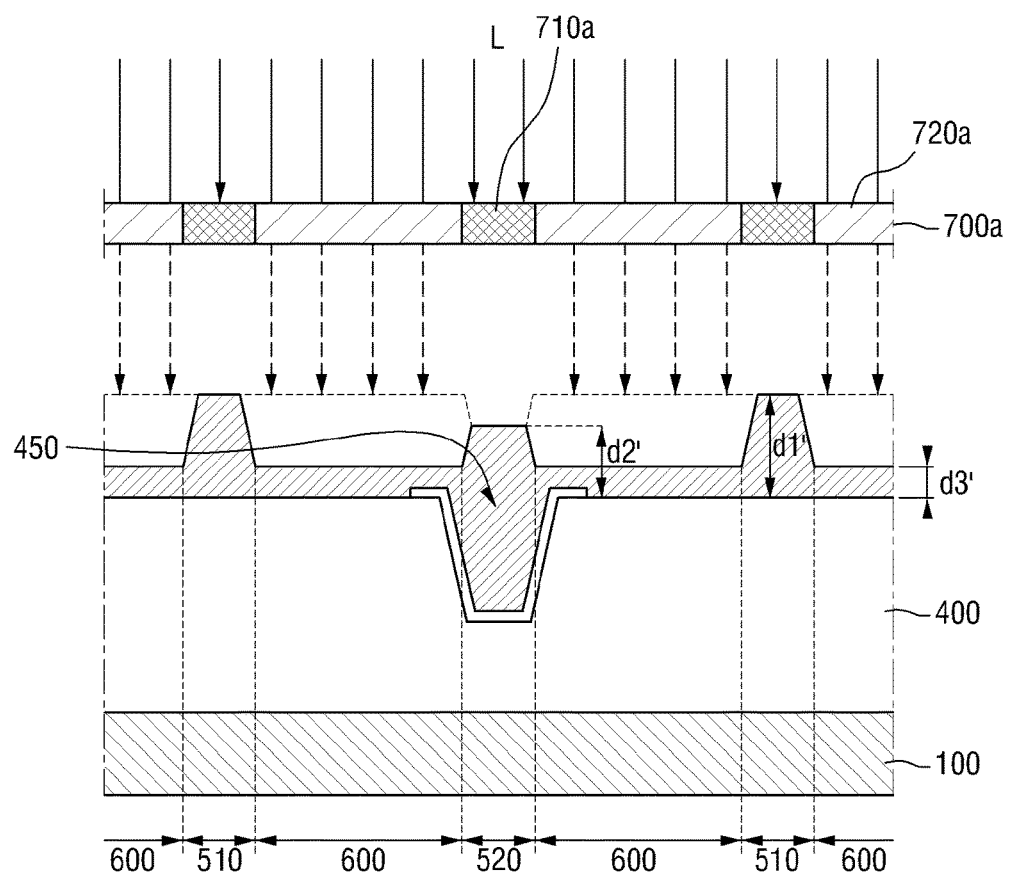

FIG. 17 is a cross-sectional view taken along line XVII-XVII' of FIG. 16. FIG. 18 is a cross-sectional view taken along line XVIII-XVIII' of FIG. 16.

Referring to FIGS. 17 and 18, the light shielding member 600 and the spacer portion 500 separated in a plurality of islands arranged in one direction DR may be simultaneously formed, using the photomask 700a including the full mask 710a and the half mask 720a. More specifically, the main spacer 510 and the auxiliary spacer 520 may be formed using the full mask 710a, and the light shielding member 600 may be formed using the half mask 720a.

As illustrated in FIG. 18, the main spacer 510 and the auxiliary spacer 520 may be discontinuously disposed on the lower layer 400. That is, the main spacer 510 and the auxiliary spacer 520 may be spaced apart from each other. The light shielding member 600 may be formed in circumferential portions/edges of the main spacer 510 and the auxiliary spacer 520. That is, the light shielding member 600 may be formed to be interposed between the main spacer 510 and the auxiliary spacer 520. The light shielding member 600 may connect the main spacer 510 and the auxiliary spacer 520. The main spacer 510, the auxiliary spacer 520, and the light shielding member 600 may be integrally formed at the same time using the same photoresist layer 550 which has light shielding characteristic.

In the method of manufacturing a liquid crystal display device according to another exemplary embodiment of the present inventive concept, a step portion may be uniformly formed between the main spacer 510 and the auxiliary spacer 520 through the full mask 710a without a separate control of transmittance, using the recessed portion/the step portion formed in a region corresponding to the contact hole 450, in the surface of the photoresist layer 550.

The height d1' of the main spacer 510 from a surface of the lower layer 400 in which the contact hole 450 is not formed, may be greater than the height d2' of the auxiliary spacer 520 from the surface of the lower layer 400 in which the contact hole 450 is formed because the thickness of the photo-resistor on a region corresponding to the contact hole may be less than that of the other region.

In addition, the height d2' of the auxiliary spacer 520 from the surface of the lower layer 400 in which the contact hole 450 is formed may be greater than the height d3' of the light shielding member 600 from the surface of the lower layer 400 in which the contact hole 450 is not formed.

That is, the height d1', d2' and d3' measured from the surface of the lower layer 400 in which the contact hole 450 is not formed may have the following relationship. The height d1' of the main spacer 510 may be greater than the height d2' of the auxiliary spacer 520, and the height d2' of the auxiliary spacer 520 may be greater than the height d3' of the light shielding member 600.

The exemplary embodiment exemplifies a case in which the spacer portion 500 and the light shielding member 600 are simultaneously formed using the photomask 700a including the full mask 710a and the half mask 720a, but is not limited thereto. The spacer portion 500 and the light shielding member 600 may not be formed simultaneously.

Next, the liquid crystal layer 300 and the second substrate 200 may be formed on the spacer portion 500 and the light shielding member 600.

Figure 19:
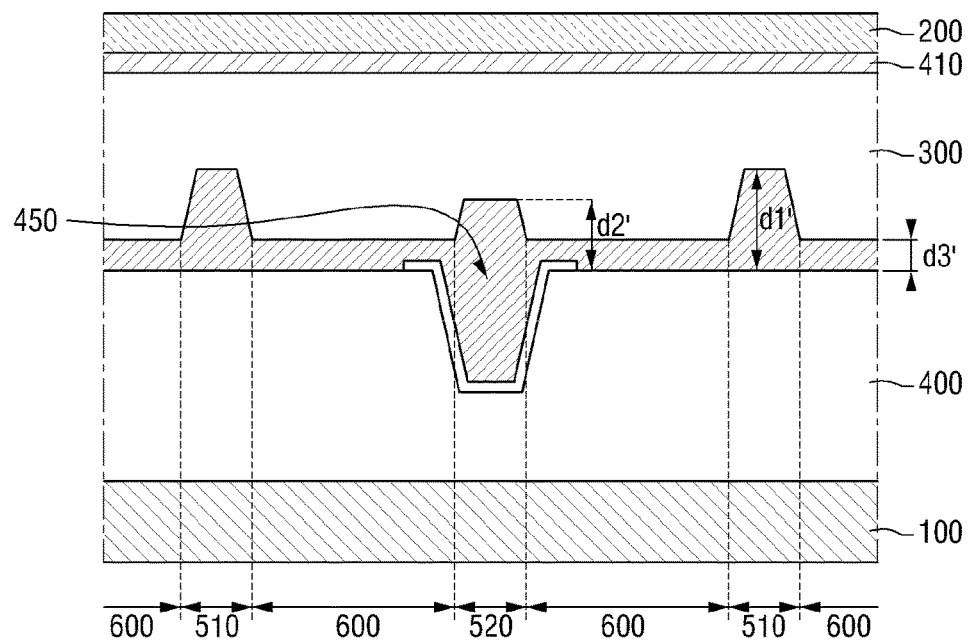

Referring to FIG. 19, after forming the spacer portion 500 and the light shielding member 600 on the lower layer 400, the liquid crystal layer 300 and the second substrate 200 may be sequentially formed on the spacer portion 500 and the light shielding member 600. The common electrode 410 may be formed on one surface of the second substrate 200 as illustrated in FIG. 19, but which is merely provided by way of example. The present inventive concept is not limited thereto.

As set forth above, in a liquid crystal display device according to an exemplary embodiment of the present inventive concept, a step portion between a main spacer and an auxiliary spacer may be uniformly formed.

In a method of manufacturing of a liquid crystal display device according to an exemplary embodiment of the present inventive concept, a step portion between a main spacer and an auxiliary spacer may be uniformly formed using a recess form on the contact hole when coating the photo-resist layer.

In a method of manufacturing of a liquid crystal display device according to another exemplary embodiment of the present inventive concept, the number of main spacers and auxiliary spacers may be controlled by adjusting locations of full mask portions in the mask and the number of contact holes or dummy contact holes, respectively.

Effects according to the exemplary embodiments of the present inventive concept are not limited to the contents exemplified as above, and further various effects may be included within the specification.

While exemplary embodiments have been shown and described above, it will be apparent to those skilled in the art that modifications and variations could be made without departing from the scope of the inventive concept as defined by the appended claims.

What is claimed is:

1. A liquid crystal display device comprising:
a first substrate and a second substrate opposed to the first substrate;
a liquid crystal layer interposed between the first substrate and the second substrate;
a lower layer disposed on the first substrate and including a drain electrode and at least one recessed portion which includes a contact hole or a dummy contact hole; and
a spacer portion and a light shielding member disposed on the lower layer, wherein the spacer portion includes a main spacer not overlapping the recessed portion and an auxiliary spacer overlapping at least a center portion of the recessed portion,
wherein a thickness of the main spacer from an upper surface of the lower layer is greater than a thickness of the auxiliary spacer from the upper surface of the lower layer and the thickness of the auxiliary spacer from the upper surface of the lower layer is greater than a thickness of the light shielding member from the upper surface of the lower layer,
wherein the main spacer, the auxiliary spacer and the light shielding member are formed of the same material and are formed in one piece,
wherein at least a portion of the main spacer and at least a portion of auxiliary spacer overlap the drain electrode,
wherein a shape of the spacer portion is a linear shape, and wherein the main spacer is directly connected to the auxiliary spacer.

2. The liquid crystal display device of claim 1, wherein the spacer portion has a predetermined width and extends in one direction, and
wherein a width of the auxiliary spacer is smaller than a width of the contact hole.

3. The liquid crystal display device of claim 2, wherein the lower layer includes a gate line, and the one direction in which the spacer portion extends is substantially the same to a direction in which the gate line extends.

4. The liquid crystal display device of claim 3, wherein light shielding member completely surrounds the spacer portion.

5. The liquid crystal display device of claim 1, wherein, in the spacer portion, the main spacer and the auxiliary spacer are continuously disposed.

6. The liquid crystal display device of claim 1, wherein, in the spacer portion, a length of the auxiliary spacer is in proportion to a length of the recessed portion.

7. The liquid crystal display device of claim 1, wherein the lower layer includes a first recessed portion and a second recessed portion, each of the first recessed portion and the second recessed portion overlaps at least a portion of the auxiliary spacer, and a length of the first recessed portion is different from that of the second recessed portion.

8. The liquid crystal display device of claim 1, wherein, in the spacer portion, the main spacer and the auxiliary spacer are spaced apart from each other and the light shielding member completely surrounds the main spacer and the auxiliary spacer and connects the main spacer and the auxiliary spacer.

9. The liquid crystal display device of claim 1, wherein the lower layer includes a thin film transistor, at least a portion of the thin film transistor being exposed by the recessed portion.

10. A method of manufacturing a liquid crystal display device, the method comprising:
forming a lower layer including a thin film transistor which includes a drain electrode on a first substrate;

forming at least one recessed portion in the lower layer, the recessed portion including a contact hole or a dummy contact hole; and simultaneously forming a spacer portion and a light shielding member on the lower layer, wherein the spacer portion includes a main spacer not overlapping the recessed portion and an auxiliary spacer overlapping at least a center portion of the recessed portion, wherein a thickness of the main spacer from an upper surface of the lower layer is greater than a thickness of the auxiliary spacer from the upper surface of the lower layer and the thickness of the auxiliary spacer from the upper surface of the lower layer is greater than a thickness of the light shielding member from the upper surface of the lower layer, wherein the main spacer, the auxiliary spacer and the light shielding member are formed of the same material and are formed in one piece, wherein at least a portion of the main spacer and at least a portion of auxiliary spacer overlap the drain electrode, wherein a shape of the spacer portion is a linear shape, and wherein the main spacer is directly connected to the auxiliary spacer.

11. The method of claim 10, wherein the main spacer, the auxiliary spacer, and the light shielding member are simultaneously formed using a two-tone mask including a full mask and a half mask and, wherein the main spacer and the auxiliary spacer are formed using the full mask while the light shielding member is formed using the half mask.

12. The method of claim 11, wherein the light shielding member completely surrounds the spacer portion.

13. The method of claim 11, wherein, in the spacer portion, the main spacer and the auxiliary spacer are spaced apart from each other, wherein the light shielding member completely surrounds the main spacer and the auxiliary spacer and connects the main spacer and the auxiliary spacer.

14. The method of claim 10, wherein the spacer portion has a predetermined width and extends in one direction.

15. The method of claim 10, wherein, in the spacer portion, the main spacer and the auxiliary spacer are continuously formed.

16. The method of claim 10, wherein the lower layer includes a first recessed portion and a second recessed portion, each of the first recessed portion and the second recessed portion overlaps at least a portion of the auxiliary spacer, and a length of the first recessed portion is different from that of the second recessed portion.

17. The method of claim 16, wherein, in the lower layer, a width of the first recessed portion is substantially the same to that of the second recessed portion.

* * * * *